US00RE37887E

(19) United States
(12) Reissued Patent
Yates

(10) Patent Number: US RE37,887 E
(45) **Date of Reissued Patent: *Oct. 22, 2002**

(54) CONCAVE FOOTBAG PADS

(76) Inventor: Ronald C. Yates, 565 Esplande, #207, Redondo Beach, CA (US) 90277

( * ) Notice: This patent is subject to a terminal disclaimer.

(21) Appl. No.: 09/836,002

(22) Filed: Apr. 17, 2001

Related U.S. Patent Documents

Reissue of:
(64) Patent No.: 5,894,685
Issued: Apr. 20, 1999
Appl. No.: 08/774,658
Filed: Dec. 30, 1996

(51) Int. Cl.[7] ..... A43B 5/00
(52) U.S. Cl. ..... 36/133; 36/132; 36/136; 36/71
(58) Field of Search ..... 36/1, 7.2, 71, 72 R, 36/132, 133, 136

(56) References Cited

U.S. PATENT DOCUMENTS

| | | | | |
|---|---|---|---|---|
| 1,637,278 A | * | 7/1927 | Renz | |
| 3,169,019 A | * | 2/1965 | Genjack | |
| 4,161,828 A | | 7/1979 | Benseler | |
| 4,204,346 A | | 5/1980 | Fugere | |
| 4,255,876 A | | 3/1981 | Johnson | |
| 4,255,877 A | | 3/1981 | Bowerman | |
| 4,316,332 A | | 2/1982 | Giese et al. | |
| 4,617,746 A | | 10/1986 | Hannah | |
| 4,712,317 A | | 12/1987 | Sowell | |
| 4,793,075 A | | 12/1988 | Thatcher | |
| 4,899,470 A | | 2/1990 | Holland, III | |
| 5,080,371 A | * | 1/1992 | Karczewski | |
| 5,437,112 A | | 8/1995 | Johnston | |
| 5,711,092 A | * | 1/1998 | Despres et al. | 36/72 R |

FOREIGN PATENT DOCUMENTS

| | | |
|---|---|---|
| EP | 496931 | 8/1992 |
| GB | 2060351 | 5/1981 |

* cited by examiner

*Primary Examiner*—M. D. Patterson
(74) *Attorney, Agent, or Firm*—Lyon & Lyon LLP

(57) ABSTRACT

This invention comprises a plurality of concave pads adapted to be externally attached to the foot or to athletic or other footwear for use in foot game sports.

26 Claims, 4 Drawing Sheets

AMENDED
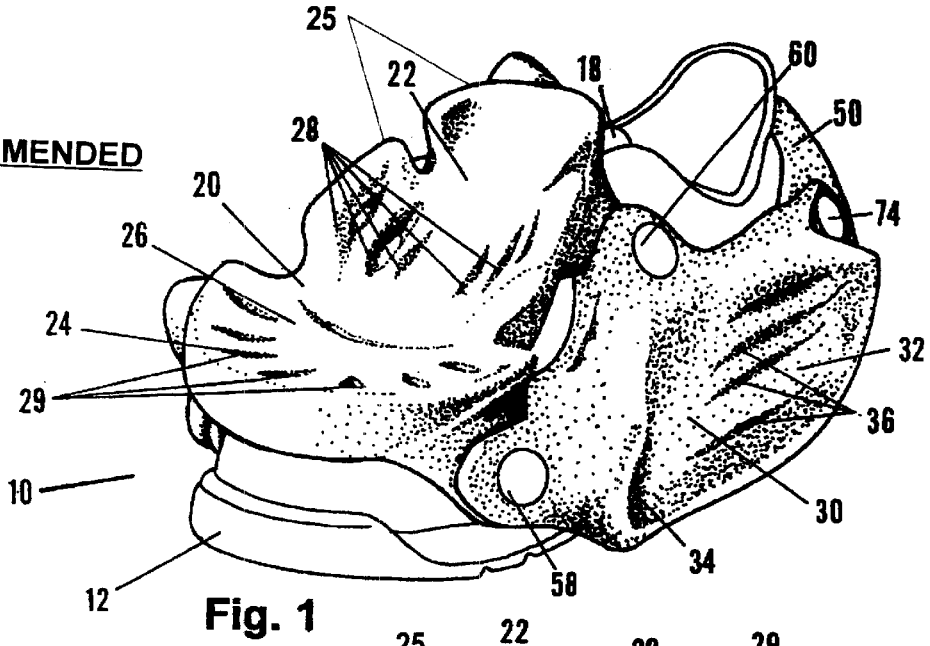
Fig. 1
AMENDED

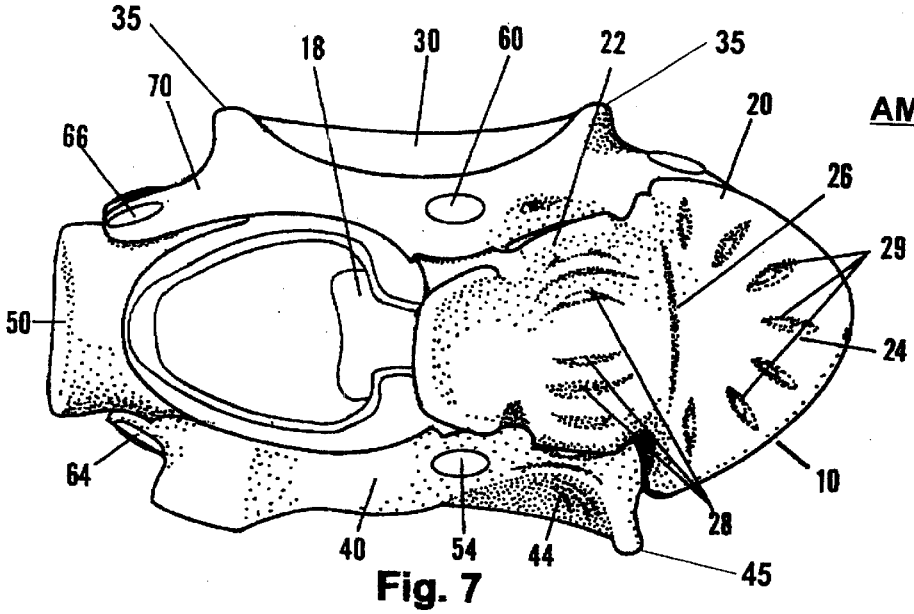
AMENDED
Fig. 7

CONCAVE FOOTBAG PADS

Matter enclosed in heavy brackets [ ] appears in the original patent but forms no part of this reissue specification; matter printed in italics indicates the additions made by reissue.

The inventor has registered this invention under Disclosure Document No. 371091 on Feb. 27, 1995.

BACKGROUND OF THE INVENTION

There are a variety of sports and games where the players foot is used to kick or to catch and toss a small ball, shuttlecock, or footbag. Other objects such as rocks, golf balls, ping pong balls and any other relatively small object can be utilized. The most popular form of this type of sport or game is "Footbag".There are footbag tournaments, footbag magazines and various other activites associated with the sport. It can be played by one person alone or in groups or teams, in circles or across nets.

A footbag is a small, pliable, ball-like object with little or no bounce. Cover materials may vary considerably, but most are filled with light-weight, plastic pellets or with sand. Cover designs range from seamless one-piece to internally hand stitched, multi-panel patterns. Although footbag dimensions vary according to their intended use, they are generally about 2" in diameter and weigh just over an ounce. Although the concept of using the feet to keep an object aloft, as a game, can be traced as far back as 2500 BC in Mainland China, it wasn't until 1972, in Portland, Oreg. that footbag, as it is known today, really began its growth. Footbag can also be played using a "koosh ball", which is made of many pieces of elastic rubber strips protruding approximately 1" from a central rubber ball.

Footbag freestyle is normally played co-operatively with the players forming a circle to involve everyone equally and, although a player may use any part of the body to "stall" the footbag, it is mainly played by using the feet, and by so doing, perform various tricks before passing it on. The footbag may not come in contact with the forearm (from the elbow to the fingertips) while it is in play. The hands may only be used to retrieve and to serve the footbag. The footbag is also often played by kicking it rather than stalling and tossing it.

Players have, until now, used an assortment of regular shoes, athletic shoes, sandals or even their bare feet to play footbag. As footbag is mostly a foot-eye coordination game, the player had to locate the contact points, or target areas on the foot-wear or feet, in order to make contact with the footbag. As these surfaces are undefined as to their precise visual and physical location, they are difficult to locate and, because of their irregular surface area, it is difficult to control the direction of the footbag, thus making the game difficult to play, especially for the novice.

The choice of foot-wear most individual freestyle championship entrants use, is the "Adidas-Rod Laver" tennis shoe, which, even though it has a wide tongue surface area, still has certain disadvantages, namely that the stitching on the eye-tabs has to be cut with a blade in order to expose and enlarge the tongue area, in order that it may function as a catching and stalling surface. Because of the smooth surface of the shoe there is a limit to the number of tricks that can be performed, also, because the contact points or target areas are undefined, it is difficult for players to locate these points when the footbag is in play. Another disadvantage is that the lace bows are unsecured and they tend to flop around during play and can be disruptive to the player and even cause the footbag to be deflected.

OBJECTS OF THE INVENTION

Accordingly, several objects and advantages of the invention are as follows:

To provide physical concave pad target areas adapted to be attached directly to the feet, to footwear or manufactured as a part of the footwear, to improve a player's ability to catch and toss the playing device. In a preferred embodiment these target areas may be located on the outside of the foot, from the ankle to over the fifth metatarsal, projecting from the sole next to the small toe, on the toe area, on the tongue area, on the instep, over the big toe, on the heel, and on the outside of the foot. These areas are physically defined with upturned edges and visually defined with shadows which make them easier for the player to see and locate. As the game of footbag is mainly a foot-eye coordination game which requires the player to locate these certain points on the foot in order to kick and to stall the footbag, the above described target pads will enhance the ability to play.

Another object of the invention is to provide a larger surface area of pads compared to catching surfaces in the prior art to make it easier for the player to make contact with the footbag or other playing object.

Yet another object of the invention is to provide pads, which may be brightly colored thus enhancing their visibility and by so doing make it easier for the player to make contact with the playing object.

Yet another object of the invention is to provide prominent concave surfaces of the pads which make it easier for the player to control the direction of the object when kicking it and make it easier for the player to "catch" or "stall" the object.

Still another object of the invention is to provide a protruded and extended shape of some of the surfaces of the pads, to allow new and more complex tricks and games to be performed, thus advancing the game.

Still another object of the invention, in the case of known footbag sports, such as footbag net, footbag golf, footbag consecutive and footbag freestyle, is to provide pads which are shaped and positioned to best serve the various kicks and stalls used in each sport.

Still another object of the invention is to provide pads which are interchangeable, thereby allowing players to customize their own footwear.

Yet another object of the invention is to provide pads which could be attached to the feet directly in order to be able to play bare-footed or to be attached to footwear, such as sandals, making the sporting footwear lighter and cooler or to provide pads which could be attached to an adjustable harness or "spat" which could fit a variety of footwear.

Still further objects and advantages will become apparent from a consideration of the ensuing description and accompanying drawings.

BRIEF DESCRIPTION OF THE DRAWINGS

FIG. 1 is a perspective view of front of the invention showing the pads attached to an athletic shoe;

FIG. 7 is a top view thereof; and

DETAILED DESCRIPTION OF THE INVENTION

Figure 2:
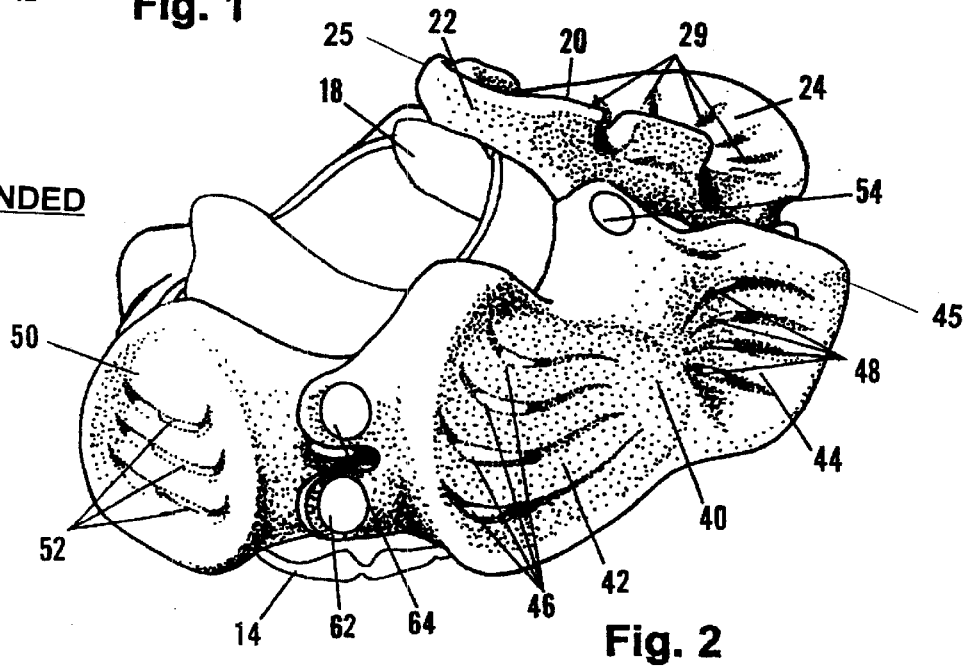
FIG. 2 is a perspective view of the rear thereof.
Figure 3:
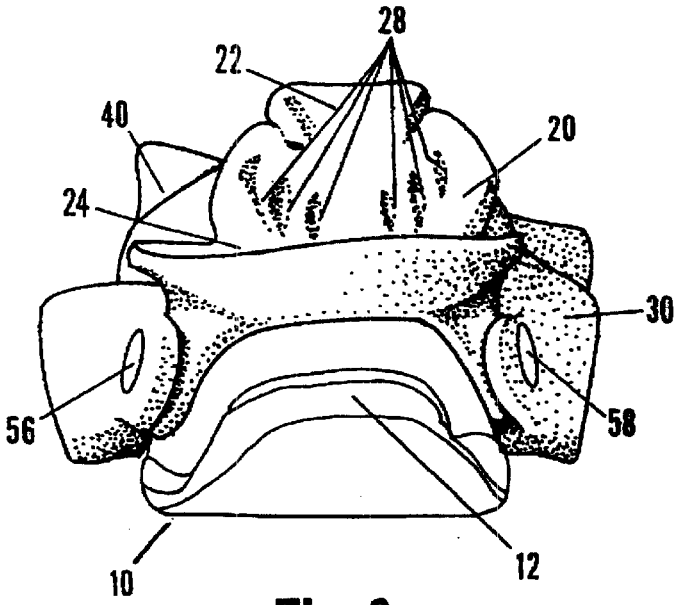
FIG. 3 is a front view thereof.
Figure 4:
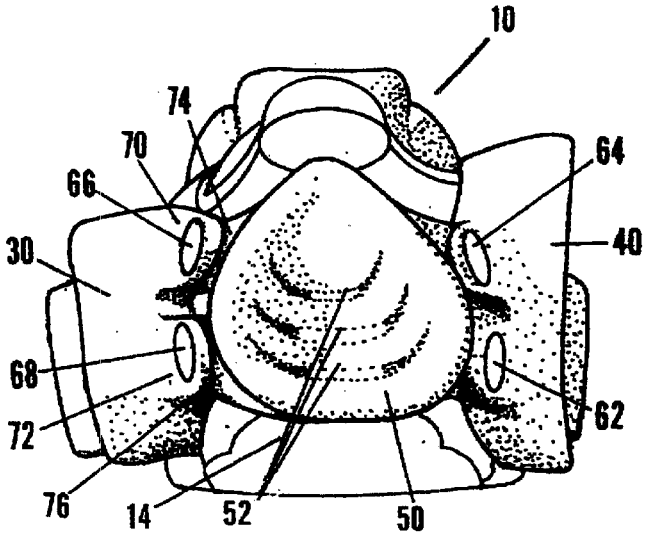
FIG. 4 is a rear view thereof.
Figure 5:
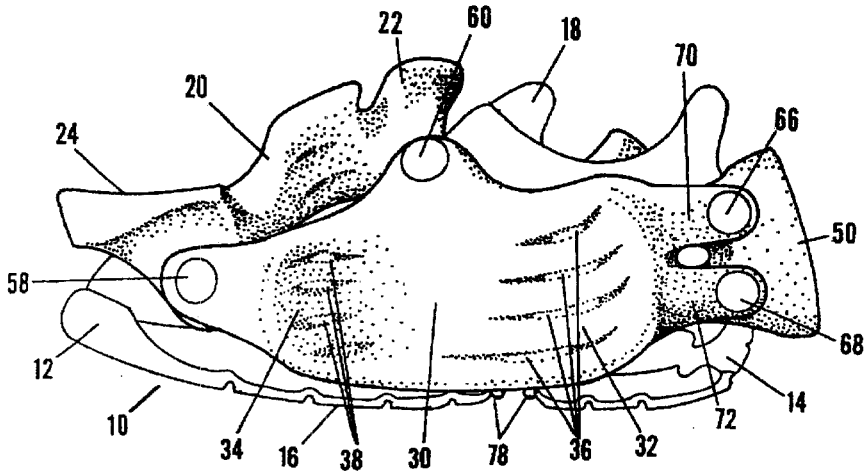
FIG. 5 is a side view of the instep side thereof.
Figure 6:
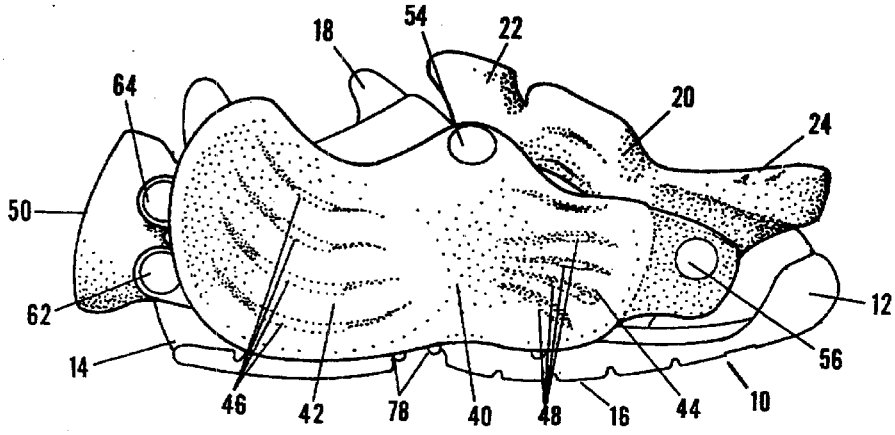
FIG. 6 is a side view of the outside thereof.
Figure 8:
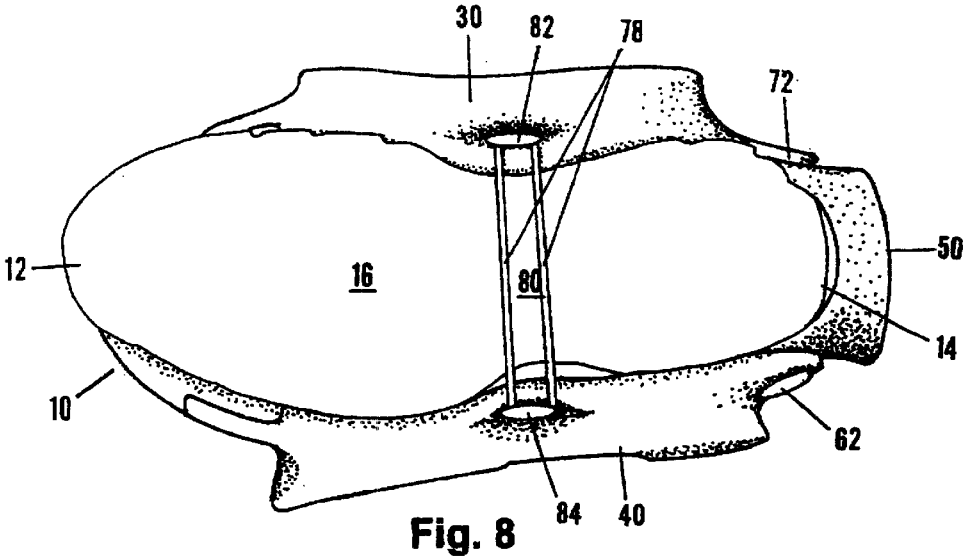
FIG. 8 is a bottom view thereof.

Referring now to the drawings, there is shown an athletic shoe 10 having a toe portion 12 a heel portion 14 a sole portion 16 and a tongue 18. A plurality of concave shaped pads, as will be described, are adapted to be attached together to be fitted around the shoe 10 and fastened in a manner so that they are securely but removably attached to the shoe 10. It is also contemplated that the pads can be made as a part of the shoe at the time of manufacture, so that the pads can either be fixed or removable.

Referring to all of the drawings, there is shown a toe pad 20 comprising an upper or lace portion 22 and a lower or toe portion 24. Each portion 22 and 24 is concave in shape and thus adapted to provide a surface to catch the playing object, such as a footbag. A crease 26 is provided to allow the toe pad 20 to bend along with the foot. *The concave toe pad target area is physically defined with an upturned edge 25 along a portion of the perimeter of the concave portion 22 as shown in FIGS. 1 & 2.* Toe pad 20 has a plurality of holes or vents 28 & 29 in both sections 22 & 24 of the pad 20, to provide air flow, making the pads cooler to wear and also to reduce the total weight of the pads in order to make them lighter for the player to wear, although the vents are optional and the pads can be made and utilized without vents.

An inside or instep pad 30 is provided, also concave in shape, to also provide surfaces to catch the playing object. Instep pad 30 has two concave surfaces 32 & 34 in which to catch or stall the playing object. *The concave instep pad target area is physically defined with an upturned edge 35 along a portion of the perimeter of the concave portion 32, 34 as shown in FIG. 7.* [It] *Instep pad 30* also has vents 36 & 38 for cooling and reduction of weight.

An outside or ankle pad 40 also comprises two concave pad areas 42 & 44 which have vents 46 & 48. *The concave ankle pad target area is physically defined with an upturned edge 45 along a portion of the perimeter of the concave portion 44 as shown in FIGS. 2 & 7.* Heel pad 50 is also concave in shape and has vents [52].

Each of the four basic pads 20, 30, 40, and 50 are held together by connectors. Connectors 54 & 56 connect ankle pad 40 to toe pad 20. Connectors 58 & 60 connect toe pad 20 to instep pad 30. Connectors 62 & 64 similarly connect one side of heel pad 150 to ankle pad 40. The rear or heel end of instep pad 30 has two connectors 66 & 68 attached to which are two strap connectors 70 & 72 which are adapted to fit over connectors 74 & 76 attached to heel pad 50. Strap connectors 70 & 72 are made of a strong elastic material, such as Neoprene, and are sized so that pulling them tightly to fit over connectors 74 & 76 pulls the pad system tightly against the shoe to hold it in place.

In addition, there is provided a stirrup connection 78 which is an elastic O-ring band, which fits underneath the shoe in the raised portion under the arch of the shoe 80, and fits over connectors 82 & 84. Stirrup connector 78 holds the entire pad system against the shoe in the vertical plane. The combination of the elastic connectors 70 & 72 and the O-ring 78 makes the pad system suitable to be fitted over any athletic shoe, sandal or even a bare foot, in order to use the pads to play the foot games described.

The pads themselves may be made of any suitable material, such as a hard or soft plastic or a foam plastic material such as polyurethane. The softer foam is usually preferred since it provides a softer surface as the footbag or ball is caught on the pad, giving greater control.

The connectors described may be any suitable connector such as a rivet or a ratchet rivet such as those manufactured by NMC Fastening Systems, Inc. The pads may also be formed by a molding process, such as injection molding, either in sections as described, or as one complete unit, requiring only one set of elastic connectors to pull the pads tightly around the shoe and the stirrup connection under the shoe.

The pads can also be attached to footwear by other convenient means such as hook and loop, snap fits or any other connection means. The pads can be connected together, as shown in the preferred embodiment, or they can be attached individually, depending on the method of attachment. The pads, however are especially useful when they are adapted so that a plurality of pads can be added to any footwear now available, so that the user does not have to purchase a specially manufactured shoe with the pads built in, even if available.

The pad system as described not only allows the player to better kick, catch and throw the play object but provides surfaces not heretofore known in footbag games, allowing the player to create new tricks never before done. It is also seen that pads adapted to fit on other portions of the feet or shoe and pads of varying sizes may provide additional opportunities for new plays or tricks by the player.

In footbag in particular, the pads of this invention provide unusual opportunities for new feats, since the footbag is often filled with small pellets or sand. The pellets or sand tend to drop slightly into the vents in the pads of this invention allowing the player to better stall the bag and allowing the player to put a spin on the bag when tossing it back into the air. Many additional feats and tricks are made possible by the pads of this invention.

Having thus described the invention,

I claim:

1. A plurality of pads that may be positioned externally over footware, constructed for controlling an object for a game, comprising:

a) "toe pad" that will overlie the top of the footware, comprised of an upper portion and a lower portion, with a flexible crease dividing said portions, that is connected to;

b) an "instep pad" that will cover the instep portion of the footware, that is connected to;

c) a "heel pad" that will cover the back heel portion of the footware, that is connected to;

d) an "ankle pad" that will cover the lateral portion of the footware, that is connected to said toe pad wherein said pads posses at least one substantial concavity of at least 1 inch in diameter.

2. A combination of a shoe with a plurality of pads according to claim 1 externally mounted thereon.

3. A plurality of pads in accordance with either preceding claim 1 in which said pads are having means for adjustibly connecting said pads to one another so as to facilitate attachment and removal of said pad assembly over footware.

4. The plurality of pads as in claim 3 wherein said pad assembly is further secured to said footware by a connecting means attached to said instep pad and said ankle pad, and running underneath of said footware.

5. A plurality of pads in accordance with claim 4 in which said pads contain at least one hole.

6. A plurality of pads in accordance with preceding claim 5 in which the pads are brightly colored.

7. A plurality of pads in accordance with preceding claim 4 in which the pads are brightly colored.

8. A plurality of pads in accordance with claim 3 in which said pads contain at least one hole.

9. A plurality of pads in accordance with preceding claim 8 in which the pads are brightly colored.

10. A plurality of pads in accordance with preceding claim 3 in which the pads are brightly colored.

11. The plurality of pads as in claim 1 wherein said pad assembly is further secured to said footware by a connecting means attached to said instep pad and said ankle pad, and running underneath of said footware.

12. A plurality of pads in accordance with claim 11 in which said pads contain at least one hole.

13. A plurality of pads in accordance with preceding claim 12 in which the pads are brightly colored.

14. A plurality of pads in accordance with preceding claim 11 in which the pads are brightly colored.

15. A plurality of pads in accordance with either claim 1, or 2 in which said pads contain at least one hole.

16. plurality of pads in accordance with preceding claim 15 in which the pads are brightly colored.

17. A plurality of pads in accordance with any one of preceding claims 1, or 2 in which the pads are brightly colored.

*18. A plurality of pads that may be positioned externally over footware, constructed for controlling an object for a game, comprising:*

*a toe pad that will overlie the top of the footware, comprised of an upper portion and a lower portion, with a flexible crease dividing said portions, that is connected to; and*

*an instep pad that will cover the instep portion of the footware, that is connected to;*

*an ankle pad that will cover the lateral portion of the footware, that is connected to said toe pad;*

*wherein said pads possess at least one substantial concavity of at least 1 inch in diameter.*

*19. The plurality of pads of claim 18 wherein at least one substantial concavity includes a perimeter and an upturned edge, the upturned edge defining at least a portion of the perimeter.*

*20. The plurality of pads of claim 18 wherein said pads having means for adjustably connecting said pads to one another so as to facilitate attachment and removal of said pad assembly over footware.*

*21. The plurality of pads of claim 18 wherein said pads are secured to said footware by a connecting means attached to the instep pad and ankle pad and extending underneath of said footware.*

*22. A combination of a shoe with a plurality of pads according to claim 18 externally mounted thereon.*

*23. A device that may be positioned externally over footware, constructed for controlling an object for a game, comprising:*

*a pad that will overlie the top of the footware, comprised of an upper portion and a lower portion, with a flexible crease dividing said portions; and*

*a connecting means attached to said pad so as to facilitate attachment and removal of said pad over footware;*

*wherein said pad possesses at least one substantial concavity of at least 1 inch in diameter.*

*24. A combination of a shoe with a pad according to claim 23 externally mounted thereon.*

*25. The device of claim 23 wherein said substantial concavity includes a perimeter and an upturned edge, the upturned edge defining at least a portion of said perimeter.*

*26. The device of claim 23 wherein the pad includes a hole through the pad.*

* * * * *